Figure 1:
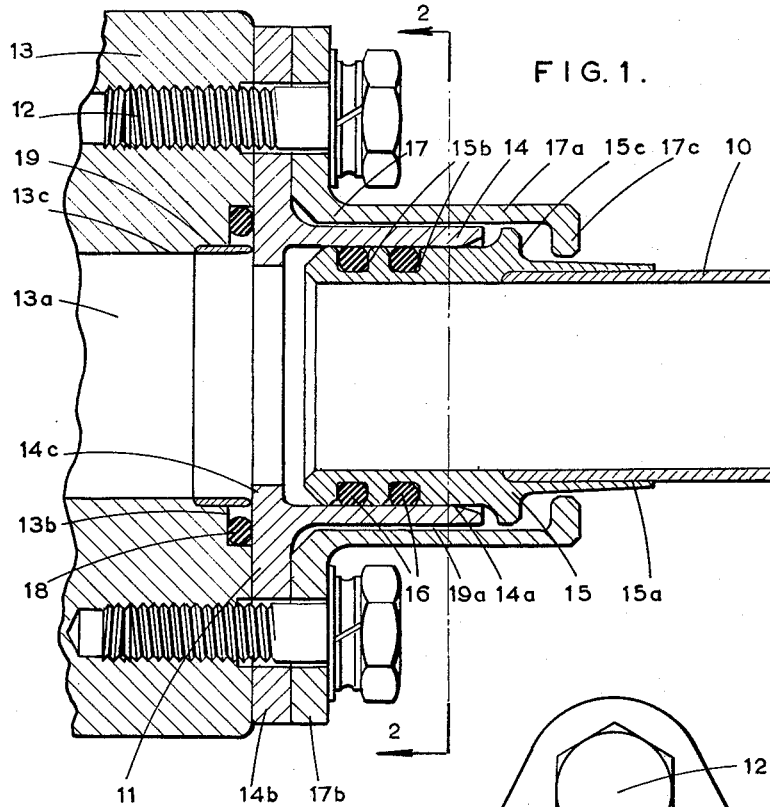

Sept. 26, 1961  A. B. TOMLINSON ET AL  3,001,804

PIPE END FITTINGS

Filed March 14, 1958

Alan Bernard
Tomlinson
and
Gerald George
Elms

INVENTORS

BY Leech & Radue
ATTORNEYS

3,001,804
PIPE END FITTINGS

Alan Bernard Tomlinson, Chaddesden, Derby, and Gerard George Elms, Alvaston, Derby, England, assignors to Rolls-Royce Limited, Derby, England, a British company
Filed Mar. 14, 1958, Ser. No. 721,526
Claims priority, application Great Britain Mar. 18, 1957
4 Claims. (Cl. 285—159)

This invention relates to end fittings for metal pipes for the purpose of securing the end of such pipe to a body in a fluid tight manner to permit flow of fluid between the interior of the pipe and an aperture in the body.

Such fittings find application in aero engine installations, for example, in the fuel system of the engine, where pipes are provided for conveying fuel from one part of the fuel system to another.

The present invention relates particularly to end fittings of the type in which a cylindrical sealing sleeve is adapted to receive the end of the pipe, the sleeve terminating in a radial flange which is secured by threaded securing means such as setscrews or the like to a body with the bore of the pipe aligned with an aperture in the body through which fluid passes. Such a pipe end fitting will be referred to as "a pipe end fitting of the type described."

According to the present invention a pipe end fitting of the type described comprises a cylindrical flanged ferrule adapted to be secured integrally to the pipe end and received within said sealing sleeve, a sealing ring of rubber being provided between the ferrule and the internal surface of the sealing sleeve, and a retaining sleeve adapted to embrace the sealing sleeve and having at one end an inturned flange to trap the flange on the ferrule between itself and the end of said sealing sleeve, the retaining sleeve also having a radial flange portion which is adapted to bear against the radial flange on the sealing sleeve, said flange on said sealing sleeve having a plane surface adapted to bear against a plane surface on the body to which the pipe is secured, said radial flanges, on retaining and sealing sleeves, being adapted to be secured together and to the body by threaded securing means. In using the term "rubber" we include rubbers natural and synthetic.

The cylindrical flanged ferrule is secured to the pipe end integrally by means such as brazing and welding.

According to a feature of the invention the inside diameter of the retaining sleeve is made slightly greater than the outside diameter of the sealing sleeve so that a clearance is provided between the two sleeves to assist in insulating the rubber sealing ring from high temperatures externally of the fitting.

In a preferred arrangement the end of the ferrule terminates within the sealing sleeve and the flange on the sealing sleeve is provided at the end thereof remote from the pipe, the end fitting thus terminating in a plane surface, and the fitting is secured to the unit by setscrews. Thus, freeing of the fitting by removal of the setscrews permits removal of the pipe together with its fitting without necessitating a movement axially of the pipe.

Figure 2:
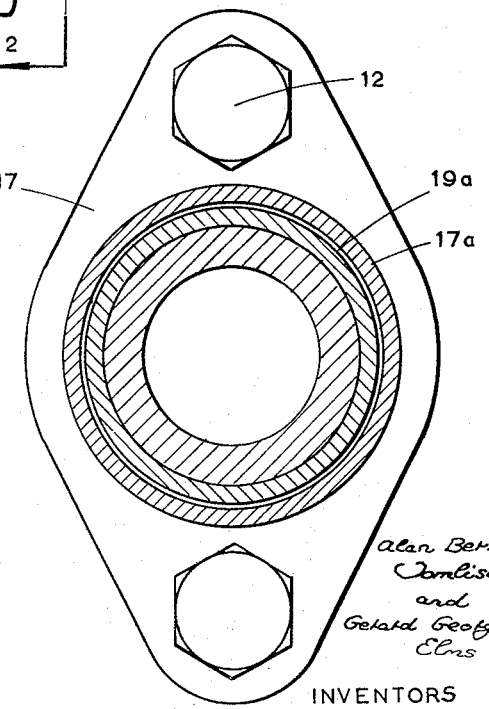

A preferred embodiment of the invention will now be described with reference to the drawings accompanying the specification in which FIGURE 1 is an axial section through a pipe end fitting, and FIGURE 2 is a section on the line 2—2 of FIGURE 1.

In the figures the pipe is indicated at 10 and has an end fitting indicated generally at 11 which is secured by setscrews 12 to a boss 13 having a passageway 13a with which the pipe 10 communicates.

The end fitting comprises a sealing sleeve 14 consisting of a cylindrical portion 14a having at one end a radial flange 14b and, received within the cylindrical portion 14a, a ferrule 15 brazed to the end of the pipe 10 at 15a. The external surface of the ferrule has two rectangular-section circumferential grooves 15b in each of which is received a rubber sealing ring 16 compressed between the inner surface of the sealing sleeve and its containing groove to form a fluid-tight seal between the sleeve and ferrule 15. The ferrule 15 also has an annular flange 15c on its external surface at a position axially spaced from the grooves 15b.

Encircling the cylindrical portion 14a on the sealing sleeve 14 is a retaining sleeve 17 having a cylindrical portion 17a terminating at one end in a radial flange 17b and at the other end in an inturned flange 17c.

The fitting 11 is secured to the boss 13 by means of two setscrews 12 which pass through aligned apertures in the flanges 14b and 17b. To assist in sealing between the plane surfaces 13a and 14c on the boss 13 and flange 14b respectively a rubber sealing ring 18 is provided in a circumferential groove 13b, one side of which is provided by a retaining tube 19 received against a stepped portion 13c of the boss. The retaining tube is trapped in position by a radially inward extension 14c of the flange 14b.

Axial disengagement of the ferrule from the sealing sleeve is prevented by the flange 15c being trapped between the right hand end of the sealing sleeve and the inturned flange 17c on the retaining sleeve.

To accommodate relative thermal expansion and also any manufacturing tolerances a clearance is provided between the flange 15c and the flange 17c on one side and the right hand end of the sleeve 14 on the other side and between the left hand end of the ferrule 15 and the flange 14c.

The internal surface of the cylindrical portion 17a of the retaining sleeve 17 is slightly greater in diameter than the external surface of the sealing sleeve 14 so that a radial clearance 19a is provided therebetween. The clearance acts to insulate the rubber sealing rings 16 in the event of the retaining sleeve being exposed to high temperatures.

We claim:

1. A fitting for connecting a pipe end to a body having a passageway coaxial with the pipe through a surface substantially normal to the axis of the passageway, in combination a cylindrical sealing sleeve terminating in a radial flange having a surface abutting and conforming to said surface on said body, a cylindrical ferrule on the pipe end closely slidably received in said sealing sleeve, a rubberlike sealing ring interposed in sealing relation between the ferrule and the internal surface of the sleeve, a radial external flange on said ferrule beyond the sealing sleeve outer end, a retaining sleeve surrounding the sealing sleeve and spaced radially therefrom throughout the length of the sealing sleeve to provide a clearance between the sleeves to assist in insulating the sealing ring from high temperatures occurring externally of the fitting, said retaining sleeve having a radial flange on one end adapted to be superimposed on and to bear against the radial flange of the sealing sleeve and having on the opposite end an inturned flange spaced from the sealing sleeve end a distance greater than the thickness of the radial flange on the ferrule but not substantially greater than the spacing between said sealing ring and the flange on the ferrule to thereby loosely trap the ferrule flange between itself and said sealing sleeve end, and means extending through said superposed flanges and engaged in said body to hold the flanges tightly against the said body.

2. A pipe end fitting as claimed in claim 1 in which the end of the ferrule terminates within the sealing sleeve and the flange on the sealing sleeve is provided at the end thereof from the pipe, the end fitting terminating in a plane surface, and the fitting being secured to the unit by set screws, on removal of which the pipe fitting can be freed without moving the pipe axially.

3. A pipe end fitting as claimed in claim 1 in which clearances are provided between the flange on the ferrule and the end of the sealing sleeve on the one side and the trapping flange on the securing sleeve on the other.

4. A pipe end fitting as claimed in claim 1 in which a rubber like sealing ring is provided between the flange on the sealing sleeve and the body to which the said flange is secured and is compressed by the means extending through said superposed flanges.

References Cited in the file of this patent

UNITED STATES PATENTS

| | | |
|---|---|---|
| 1,013,258 | Wyton | Jan. 2, 1912 |
| 1,505,121 | Allport | Aug. 19, 1924 |
| 1,755,104 | Deierlein | Apr. 15, 1930 |
| 2,014,911 | Spoehrer | Sept. 17, 1935 |
| 2,118,672 | Green | May 24, 1938 |
| 2,281,633 | Stitzer | May 5, 1942 |
| 2,445,580 | Kasten | July 20, 1948 |
| 2,521,127 | Price | Sept. 5, 1950 |
| 2,533,097 | Dale | Dec. 5, 1950 |
| 2,646,294 | Anderson | July 21, 1953 |
| 2,780,482 | Brown | Feb. 5, 1957 |
| 2,826,436 | Hupp | Mar. 11, 1958 |

FOREIGN PATENTS

| | | |
|---|---|---|
| 303,540 | Great Britain | Dec. 31, 1928 |
| 26,329 | Australia | Nov. 25, 1930 |
| 720,741 | France | Dec. 12, 1931 |